(12) United States Patent
Shen

(10) Patent No.: US 11,514,597 B1
(45) Date of Patent: Nov. 29, 2022

(54) SINGLE-CAMERA STEREOAEROPHOTOGRAMMETRY USING UAV SENSORS

(71) Applicant: James Jianming Shen, North York (CA)

(72) Inventor: James Jianming Shen, North York (CA)

(*) Notice: Subject to any disclaimer, the term of this patent is extended or adjusted under 35 U.S.C. 154(b) by 815 days.

(21) Appl. No.: 16/504,237

(22) Filed: Jul. 6, 2019

Related U.S. Application Data

(60) Provisional application No. 62/700,159, filed on Jul. 18, 2018.

(51) Int. Cl.
| | | |
|---|---|---|
| *G06T 7/593* | (2017.01) | |
| *B64C 39/02* | (2006.01) | |
| *G05D 1/00* | (2006.01) | |
| *G06C 11/00* | (2006.01) | |
| *G06V 20/13* | (2022.01) | |

(52) U.S. Cl.
CPC ............ *G06T 7/593* (2017.01); *B64C 39/024* (2013.01); *G05D 1/0094* (2013.01); *G06C 11/00* (2013.01); *G06V 20/13* (2022.01); *B64C 2201/123* (2013.01); *G06T 2207/10012* (2013.01); *G06T 2207/10028* (2013.01); *G06T 2207/10032* (2013.01)

(58) Field of Classification Search
CPC ........... G06T 7/593; G06T 2207/10012; G06T 2207/10028; G06T 2207/10032; B64C 39/024; B64C 2201/123; G05D 1/0094; G06C 11/00; G06V 20/13

USPC .......................................................... 382/106
See application file for complete search history.

(56) References Cited

U.S. PATENT DOCUMENTS

| | | | | |
|---|---|---|---|---|
| 11,029,159 | B2* | 6/2021 | Henderson | ............... G01C 3/08 |
| 2006/0129276 | A1* | 6/2006 | Watabe | ................ G05D 1/0234 |
| | | | | 701/23 |
| 2012/0173053 | A1* | 7/2012 | Ohtomo | ................ G05D 1/106 |
| | | | | 701/4 |
| 2018/0109767 | A1* | 4/2018 | Li | ....................... H04N 5/23203 |
| 2020/0020093 | A1* | 1/2020 | Frei | ....................... G06V 20/188 |
| 2020/0207474 | A1* | 7/2020 | Foggia | .................. B64C 39/024 |
| 2020/0372814 | A1* | 11/2020 | Bos | ....................... B64C 39/024 |

* cited by examiner

*Primary Examiner* — Jerome Grant, II

(57) ABSTRACT

The disclosure presents novel methods to conduct aerial surveying, inspection and measurements with higher accuracy in a fast and easy way, comprising: (1) flying a drone with an accelerometer, gyro, and camera sensors over a target object; (2) capturing a first aerial image at a first position; (3) capturing a second aerial image at a second position, wherein the second position has a horizontal and vertical displacement from the first position; (4) calculating the displacements between the first and second location using a sensor fusion estimation algorithm from the position sensors' data; (5) solving for the pixel depth information of the aerial images by using a single-camera stereophotogrammetry algorithm with the relative altitude and horizontal distance; (6) deriving the ground sample distance (GSD) of each pixel from the calculated depth information; (7) using the image pixel GSD values to compute any geometric properties of the target objects.

20 Claims, 6 Drawing Sheets

SINGLE-CAMERA STEREOAEROPHOTOGRAMMETRY USING UAV SENSORS

CROSS-REFERENCE TO RELATED APPLICATIONS

This application claims the benefit of U.S. Provisional Patent Application No. 62/700,159, filed Jul. 18, 2018. The entire disclosure of the above application is incorporated herein by reference.

FIELD

The present disclosure is in the field of aerial survey, digital imaging, digital camera, digital image processing, stereoscopy, photogrammetry, drones, UAVs, digital sensors, and remote sensing.

BACKGROUND

Aerial survey is a method of collecting geomatics, construction, or other imagery using airplanes, helicopters, UAVs, balloons, or other aerial means. Aerial survey is sometimes recognized as aerophotogrammetry, part of photogrammetry, where the camera is placed in the air. Measurements on aerial images are provided by photogrammetric technologies and methods. A special case, called stereophotogrammetry, involves estimating the three-dimensional coordinates of points on an object employing measurements made in two or more photographic images taken from different positions. Common points are identified on each image. A line of sight (or ray) can be constructed from the camera location to the point on the object. It is the intersection of these rays (triangulation) that determines the three-dimensional location of the point. Stereophotogrammetry is emerging as a robust, non-contacting measurement technique. The present disclosure discusses a combination of stereophotogrammetry and aerophotogrammetry called stereoaerophotogrammetry.

An unmanned aerial vehicle (UAV), commonly known as a drone, is an aircraft without a human pilot aboard. UAVs are a component of an unmanned aircraft system (UAS); which includes a UAV, a ground-based controller, and a system of communications between the two. The flight of UAVs may operate with various degrees of autonomy: either under remote control by a human operator or autonomously by onboard computers. From this point on in our discussion, we will use the terms "unmanned aircraft system", "UAV" and "drone" interchangeably according to the convenience of the explanation.

UAVs are normally equipped with various sensors. The position and movement sensors, such as gyro, accelerometer, GPS, barometer, etc., give information about the aircraft state. The exteroceptive sensors, such as camera, multispectral sensor, and LiDAR, deal with external information including distance measurements and imagery. One important measurement is the drone's precise current altitude—the height from sea level or ground level. The traditional methods or sensors used to measure are, but are not limited to, distance rangers (laser, sonic, radio, photometric), barometers, GPS, skydiver altimeters, and a combination of skydiver altimeters and barometers. Those devices are either too large, heavy, or expensive to be installed or used on a UAV, or the measurement is not accurate enough. The normal accuracy is around 10 to 30 feet. Some of the latest digital altimeters that can be installed on the drones provide a best accuracy of no less than 1 foot.

One of the uses of UAVs is aerial photography and surveying. For example, conducting or operating a roof examination and inspection for houses or buildings in the construction and real estate industry, which is not as easy as doing other inspections. It always requires human beings to climb onto the roof to check the condition of the rooftop and chimney, which is costly, inconvenient, and even dangerous. While roof inspection is necessary for houses and buildings since the rooftop or chimney may become damaged in use, there is a great need to provide a safer and more economical method for it. One of the solutions is to conduct the inspection, examination, and measurement by using a drone with sensors.

Even though the UAVs are relatively new on the market, there are already many applications that use UAVs and their onboard cameras and sensors for aerial inspection, surveying, and measurement. However, none of the solutions can provide very high accuracy by using drone with off-the-shelf sensors, and a fast, simple, and easy operation in the surveying, inspection, and measurement.

The present disclosure provides a group of methods and apparatus to conduct the aerial surveying, inspection, and measurements with higher accuracy in a fast and easy way, comprising: (1) flying a drone with an accelerometer sensor, gyro sensor, and single-camera to capture two aerial images and collect the sensors' data; (2) applying new single-camera stereophotogrammetry combined with an accurate sensor fusion algorithm to measure any geometric properties in the captured image.

SUMMARY

The disclosure presents novel methods to conduct aerial surveying, inspection and measurements with higher accuracy in a fast and easy way, comprising: (1) flying a drone with an accelerometer sensor, gyro sensor, and camera over a target object; (2) capturing a first aerial image at a first position with a first altitude; (3) capturing a second aerial image at a second position with a second altitude, wherein the second position has a horizontal displacement from the first position; (4) calculating the relative altitude and horizontal distance between the first and second location using a sensor fusion estimation algorithm from the position sensors' data; (5) solving for the pixel depth information of the aerial images by using a single-camera stereophotogrammetry algorithm with the relative altitude and horizontal distance; (6) deriving the ground sample distance (GSD) of each pixel from the calculated depth information; (7) using the image pixel GSD values to compute any geometric properties of the target objects.

The disclosure presents novel apparatus to conduct aerial surveying, inspection, and measurements with higher accuracy in a fast and easy way, comprising: (1) a drone with an accelerometer sensor, gyro sensor, and camera that can fly on top of the target object; (2) an onboard or offline sensor data processor that computes any geometric properties of the target objects from the captured image and sensor data according to the methods above.

DETAILED DESCRIPTION

Figure 1:
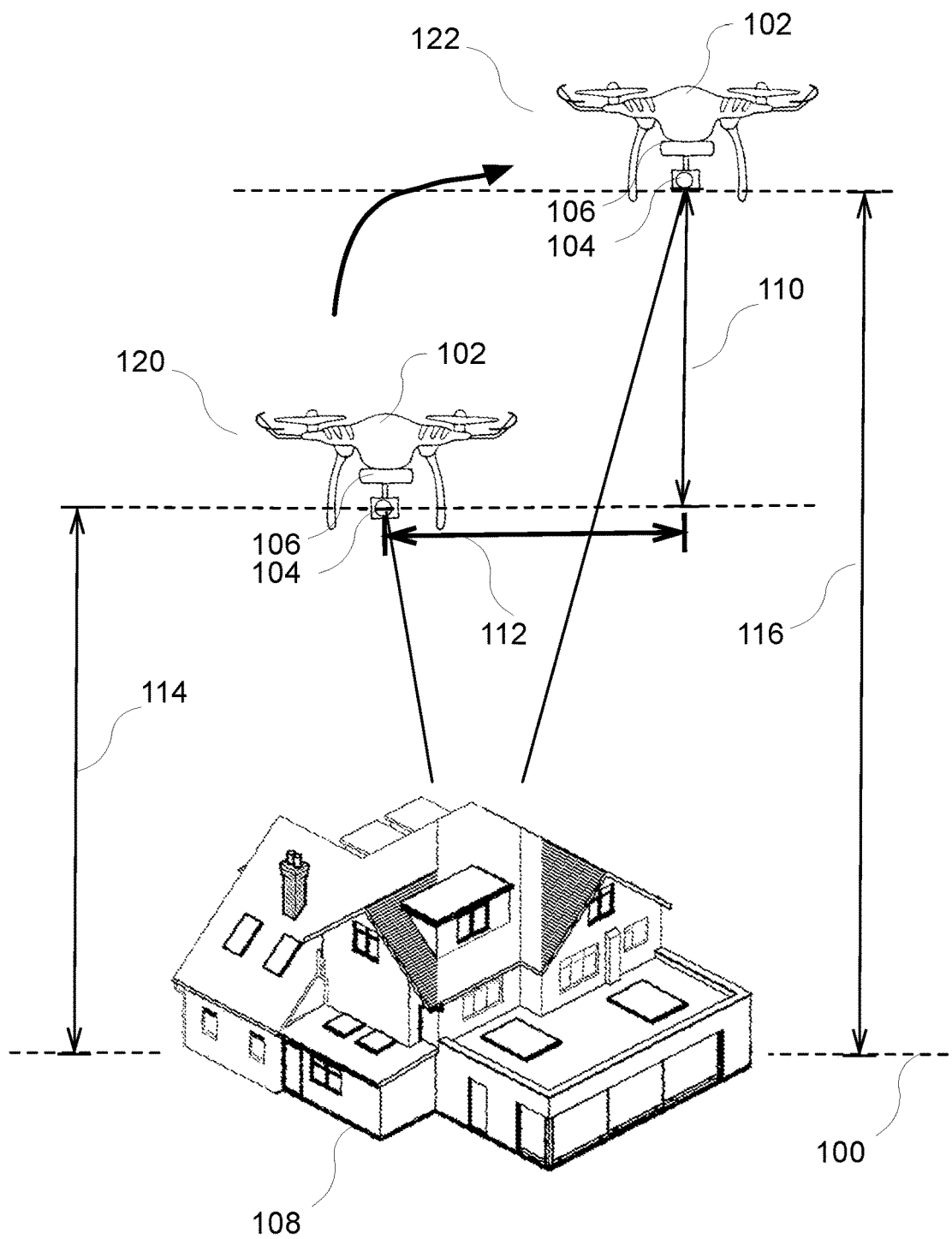
FIG. 1 illustrates a preferred embodiment of the overall system design of the present disclosure.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein. In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one ordinarily skilled in the art that the present invention may be practiced without these specific details. The present disclosure is to be considered as an exemplification of the invention, and is not intended to limit the invention to the specific embodiments illustrated by the figures or description below. The present invention will now be described by referencing the appended figures representing preferred or alternative embodiments.

The disclosure presents several novel methods to conduct aerial surveying, inspection, and measurements with higher accuracy in a fast and easy way, comprising: (1) flying a drone with an accelerometer sensor, gyro sensor, and camera over a target object; (2) capturing a first aerial image at a first position with a first altitude; (3) capturing a second aerial image at a second position with a second altitude, wherein the second position has a horizontal displacement from the first position; (4) calculating the relative altitude and horizontal distance between the first and second location using a sensor fusion estimation algorithm from the position sensors' data; (5) solving for the pixel depth information of the aerial images by using a single-camera stereophotogrammetry algorithm and the relative altitude and horizontal distance; (6) deriving the ground sample distance (GSD) of each pixel from the calculated depth information; (7) using the image pixel GSD values to compute any geometric properties of the target objects.

The disclosure also presents novel apparatus to conduct aerial surveying, inspection, and measurements with higher accuracy in a fast and easy way, comprising: (1) a drone with an accelerometer sensor and camera that can fly on top of the target object; (2) an onboard or offline sensor data processor that computes any geometric properties of the target objects from the captured image and sensor data according the methods above.

FIG. 1 illustrates a preferred embodiment of the overall system design of the present disclosure. A drone (102), or referred to as an UAV, is equipped with at minimum a gyro, accelerometer and digital camera (104). The camera (104) may be installed on a gimbal and can be adjusted to face down to shoot the ground target object at a certain image resolution. The digital image resolution achievable today is 4K, that is, 4096-by-2160 pixels, and RGB three 8 bit channels per pixel. The gyro can provide real-time rotation speed information of the drone (102) around the 3-axis, for 6-degrees of freedom, in 3D space. The accelerometer can provide real-time acceleration information of the drone (102) along the 3-axis.

A ground target object (108) is typically a house or building located on ground level (100). Each part of the target object (108) has a relative height or altitude from the ground level (100) if the height of the ground level (100) is assumed to be zero.

The drone (102) is controlled to fly to a first location (120) and stays there until the camera (104) takes a first image of the ground target object (108). The first location (120) is above the ground target object (108). The height, or altitude from the first location (120) to the ground level (100) is (114). Then the drone (102) flies to a second location (122) and stays there until the camera (104) takes a second image of the ground target object (108). The second location (122) is above the ground target object (108). The height, or altitude from the first location (122) to the ground level (100) is (116). The relative height, or relative altitude from the first location (120) to the second location (122) is (110). The relative horizontal displacement from the first location (120) to the second location (122) is (112).

In a preferred apparatus of the present disclosure, an onboard processor (106) with the software implementation of the said methods and algorithms of the present disclosure is embedded in the UAV or drone (102). In yet another embodiment of the apparatus of the present disclosure is a cloud server processor, or client-side PC software processor, implemented with the said methods and algorithms of the present disclosure. Simply by directing the drone (102) from one location (120) to another (122) and taking two images at each location, an inspection measurement collection operation is completed. The two aerial images and all the accelerometer sensor data during the movement from the first location (120) to the second location (122) are recorded and saved for onboard real-time or offline processing. The sensor data may be saved locally inside the drone (102) for onboard CPU processing (106), and the computation results may be saved locally or sent over the wireless channel to a mobile device, cloud storage, a cloud server, or a client-side PC. In the case of offline processing, the sensor data may be transferred to a mobile device, cloud server, or client-side PC. The mobile device or the remote processor processes the sensor data and computes the measurement results.

A new single-camera stereophotogrammetry algorithm combined with a high-accuracy, sensor fusion-based relative altitude estimation from the position sensors data will be applied to measure or estimate any geometric properties in the captured image, such as the distance between any two points or the area of an arbitrary closed shape.

The accuracy of the said measurement can be to the centimeter or better. The two-step measurement collection is fast and simple, and may be automated by a program in the onboard software or the software in the mobile or cloud server. In one of the exemplary embodiments of the present disclosure, a user only needs to press one button on the software UI to finish the complete measurement data collection. After that the user only needs to instruct the system to define the measurements of the captured image; it will provide immediate measurement estimations with high accuracy.

Figure 2:
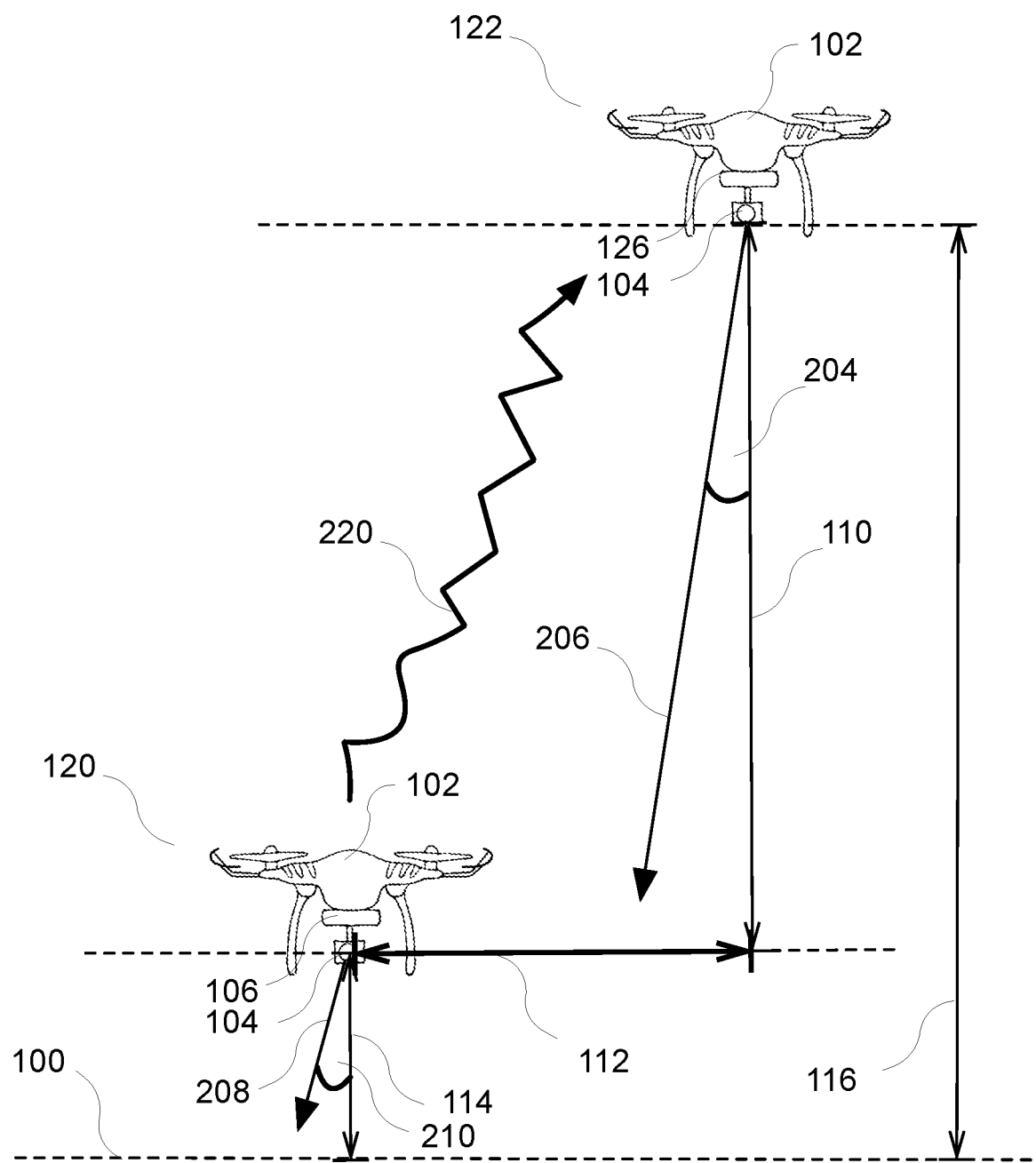
FIG. 2 illustrates a preferred embodiment of the accurate sensor fusion altitude estimation method and apparatus of the present disclosure.

FIG. 2 illustrates the method and apparatus of a preferred embodiment of a more accurate sensor fusion-based relative altitude estimation of the present disclosure. Sensor fusion methods combine data from disparate sources of information in a way that should give better performance than can be achieved when each source of information is used alone.

The drone (102) is controlled to fly to and stay at a first location (120) until the camera (104) takes a first image. The first location (120) is above the ground level (100). The height, or altitude, from the ground level (100) to the first location (120) is (114). The optical axis (208) of the camera (104) at the first location (120) forms an angle (210) with the height (114). Then the drone (102) flies to and stays at a second location (122) until the camera (104) takes a second image of the ground target object (108). The second location (122) is above the ground target object (108). The height, or altitude, from the first location (122) to the ground level (100) is (116). The optical axis (206) of the camera (104) at this second location (122) forms an angle (210) with the height (110). The relative height, or relative altitude, from the first location (120) to the second location (122) is (110). The relative horizontal displacement from the first location (120) to the second location (122) is (112).

As the drone (102) travels from the first location (120) to the second location (122), the gyro and accelerometer sensor readings are read out at a real-time frequency 1/T, a.k.a. refreshing rate, and saved into storage. Let us assume that all the readings from the gyro are represented as $G_k$, where k=1, 2, 3, ..., N; N being the last reading index when the drone (102) arrives at the second location (122). All the readings from the accelerometer are represented as $A_k$, where k=1, 2, 3, ..., N. The read-out rate can range from 1 Hz to 1000 Hz, with a typical rate of 100 Hz.

The gyro reading measures the drone's (102) rotating speeds along the X, Y, and Z axis. Gx, Gy, and Gz are three output vectors representing the rotating speeds in radians per second. The $G_{x,y,z}$ readings may be different at any moment. During the time interval $dt_{k,k+1}$ between the two consequent readings of $G_k$ and $G_{k+1}$, the angle of rotation $R_k$ can be estimated by $c*G_k*dt_{k,k+1}$. The total rotation R from $t_{k1}$ to $t_{k2}$ can be estimated by calculating the summation of all the angles of rotation, $R_k=c*Gk*dt_{k,k+1}$ of each time interval, where k=1, 2, 3, ..., N; c is a constant.

The accelerometer reading measures the acceleration of the drone's (102) movement along the X, Y, and Z axis. Ax, Ay, and Az are three output vectors representing the acceleration in meters per second squared. The $A_{x,y,z}$ readings may be different at any moment. During the time interval $dt_{k,k+1}$ between the two consequent readings of $A_k$ and $A_{k+1}$, the speed Sk can be estimated by $c*A_k*dt_{k,k+1}$. The total speed S from $t_{k1}$ to $t_{k2}$ can be estimated by calculating the summation of all the speeds, $S_k=c*A_k*dt_{k,k+1}$ of each time interval, where k=1, 2, 3, ..., N; c being a constant. Similarly, during the time interval $dt_{k,k+1}$ between the two consequent speeds $S_k$ and $S_{k+1}$, the displacement $D_k$ can be estimated by $c*S_k*dt_{k,k+1}=C*A_k*(dt_{k,k+1})^2$. The total displacement D from $t_{k1}$ to $t_{k2}$ can be estimated by calculating the summation of all the speeds, $D_k=c*S_k*dt_{k,k+1}=C*A_k*(dt_{k,k+1})^2$ of each time interval, where k=1, 2, 3, ..., N, c being a constant.

When the drone (102) is at the first location (120), the center axis of the camera lens is pointing downward to the ground with a space vector (208) $V_{L1}=(V_{1x}, V_{1y}, V_{1z})$. The space vector (114) $V_{g1}=(0, 0, g)$, where g is the earth's gravity acceleration of 9.8 Newtons per second squared. The vector (114) is pointing straight to the center of the earth. Therefore we can derive the space angle (210) $B_{L1}$ between the two vectors (114 and 208):

$B_{L1}=\arccos((V_{L1}*V_{g1})/(\|V_{L1}\|*\|V_{g1}\|))$

Similarly, the space angle (204) $B_{L2}$ between the camera lens optical axis vector (206) $V_{L2}=(V_{Nx}, V_{Ny}, V_{Nz})$ and the ground-facing vector (110) $V_{g2}=(0, 0, g)$ at the second location (122) is given by $B_{L2}=\arccos((V_{L2}*V_{g2})/(\|V_{L2}\|*\|V_{g2}\|))$ The space angle $B_{L12}$ between the $V_{L1}$ and $V_{L1}$ is arccos $((V_{L1}*V_{L2})/(\|V_{L1}\|*\|V_{L2}\|))$. So $\|BL12\|$ will be the total rotation R, as previously calculated and measured using the gyro sensor's data.

The vector $V_{L1}$ is also related to another vector from the accelerometer sensor at the first location (120). The vector is formed from the readings of the accelerometer in all three (X, Y, Z) axis, namely $A_{x1}$, $A_{y1}$, and $A_{z1}$, at the first location (120). So $A_{L1}=(A_{x1}, A_{y1}, A_{z1})$. Similarly, $V_{L2}$ is related to vector $A_{L2}=(A_{x2}, A_{y2}, A_{z2})$ based on the accelerometer readings at the second location (122). In one of the embodiments of the present disclosure, $V_{L1}=A_{L1}$ and $V_{L2}=A_{L2}$. In yet another embodiment of the present disclosure, $V_{L1}=c*A_{L1}$ and $V_{L2}=c*A_{L2}$, where c is a constant.

However, both gyro and accelerometer signals and readings are prone to noise and drift to the extent that good tracking of both orientation and position are difficult to achieve. For instance, a tracking system relying on stand-alone measurements from the gyro or accelerometer suffers from integration drifts that may lead to positioning errors of 1 meter after 10 seconds. The present disclosure uses three approaches to increase accuracy. The first is to use an extended Kalman filter (EKF) on each sensor data to reduce noise; the second is to use sensor fusion algorithms to combine the multiple sensors; the last is to greatly reduce the overall operation time, thus reducing the time for drifting. For example, complete the measurement operations under one second.

From above, a more accurate sensor fusion method to measure or estimate the relative altitude between two locations of the present disclosure can be: (1) collect the high-refresh rate readings from the accelerometer and gyro sensors; (2) integrate the filtered accelerometer data with the regulation of the integration of the filtered gyro data. The algorithm combines both the accelerometer and gyro sensor measurements to improve measurement accuracy. One exemplary embodiment of such an algorithm is described in detail below.

The higher the sensors' refresh rate, or read-out rate, the more accurate the measurement will be. The typical read-out rate is 100 Hz, meaning the sensor data is read out 100 times per second. There are high-end sensors with read-out rates of 1000 Hz or even 4000 Hz. For example, if a 4000 Hz refreshing rate accelerometer is used in the UAV algorithm of the present disclosure, the altitude measurement can, in theory, be as accurate as within 2 mm.

Assume the drone (102) starts from the first location (120) with the camera optical axis vector $V_{L1}$ ($V_{1x}$, $V_{1y}$, $V_{1z}$). Before the drone (102) arrives at the second location (122) with the camera optical axis vector $V_{L2}$ ($V_{2x}$, $V_{2y}$, $V_{2z}$), we collect all readings from the onboard gyro and accelerometer in the device memory. At any read-out time point $t_k$, vector $G_k^0=(G_{kx}^0, G_{ky}^0, G_{kz}^0)$ is the gyro reading; vector $A_k^0=(A_{kx}^0, A_{ky}^0, A_{kz}^0)$ is the accelerometer reading.

Now construct an Extended Kalman filter to filter the gyro and accelerometer readings, which are generally represented as $x_k$ as in the following formulas:

(1) Model the input reading data $x_k$ in a nonlinear system f, h, with additive noise $w_k$ and measurement error $v_k$.

$$x_k = f(x_{k-1}) + w_{k-1}$$

$$z_k = h(x_k) + v_k$$

$$Q_k = E[w_k w_k'], R_k = E[v_k v_k']$$

The initial optimal estimate $x_0^a = \mu_0 = E[x_0]$ with error covariance $P_0 = E[(x_0 - \mu_0)(x_0 - \mu_0)^T]$.

(2) From the Taylor expansion and the Jacobian of f $$J_f = \begin{bmatrix} \frac{\partial f_1}{\partial x_1} & \frac{\partial f_1}{\partial x_2} & \cdots & \frac{\partial f_1}{\partial x_n} \\ \vdots & \vdots & & \vdots \\ \frac{\partial f_n}{\partial x_1} & \frac{\partial f_n}{\partial x_2} & \cdots & \frac{\partial f_n}{\partial x_n} \end{bmatrix}$$

The prediction part of $x_k$ will be:

$$x_k^f \approx f(x_{k-1}^a)$$

The prediction error is $$e_k^f = x_k - x_k^f = f(x_{k-1}) + w_{k-1} - f(x_{k-1}^a) \approx J_f(x_{k-1}^a) e_{k-1} + w_{k-1}$$

$$P_k^f = E[e_k^f(e_k^f)'] = J_f(x_{k-1}^a) P_{k-1} J_f(x_{k-1}^a)' + Q_{k-1}$$

(3) The new optimal estimation of the sample $x_k$ with Kalman gain is $$x_k^a \approx x_k^f + K_k(z_k - h(x_k^f))$$

where $$K_k = P_k^f J_h'(x_k^f)(J_h(x_k^f) P_k^f J_h'(x_k^f) + Q_{k-1})^{-1}$$

$$P_k = (I - K_k J_h(x_k^f)) P_k^f$$

After the Kalman filtering, the filtered sensor readings are $G_k = (G_{kx}, G_{ky}, G_{kz})$ for the gyro; $A_k = (A_{kx}, A_{ky}, A_{kZ})$ for the accelerometer.

The new space vector of the drone (120) with the drone camera optical axis as the vector's direction will be calculated as follows:

$$V_{Lk}(V_{kx}, V_{ky}, V_{kz}) = V_{L1}(V_{1x}, V_{1y}, V_{1z}) + \sum_{1}^{k} cA_j(A_{Jx}, A_{Jy}, A_{Jz})(dt_{j,j+1}^2)$$

where c is a constant. Let $\overline{V_{Lk}} = V_{Lk}(V_{kx}, V_{ky}, V_{kz})$, $\overline{V_{L1}} = V_{L1}(V_{1x}, V_{1y}, V_{1z})$, and $\overline{A_j} = A_j(A_{jx}, A_{jy}, A_{jz})$. The calculation will be further regulated by the gyro reading data $\overline{R_k}$ as follows:

$$\overline{V_{Lk}} = \overline{V_{L1}} + \sum_{1}^{k} \alpha_j \cdot \overline{A_J} \cdot (dt_{j,j+1}^2)$$

$$Err_k = \underset{\alpha_j}{\operatorname{argmin}}\left(\sum_{j=1}^{k}[\overline{R_J} - \arccos(\alpha_j \cdot \overline{A_J} \cdot dt_{j,j+1}^2)]^2\right)$$

where the error is minimized in terms of the mean squared error between the two sensors' measurements.

From the algorithm above, one can compute the space vector of the drone (102) at the second location (122) as below:

$$\overline{V_{L2}} = \overline{V_{L1}} + \sum_{1}^{N} \alpha_j \cdot \overline{A_J} \cdot (dt_{j,j+1}^2)$$

So the relative altitude (110) from the first location (120) to the second location (122) is the vertical difference of the two space vectors:

$$\Delta \text{Altitude} = (\overline{V_{L2}} - \overline{V_{L1}})_z$$

The relative horizontal displacement (112) from the first location (120) to the second location (122) is the horizontal distance between the two space vectors:

$$\Delta \text{Placement} = \left\|(\overline{V_{L2}} - \overline{V_{L1}})_{xy}\right\| = \sqrt{\left\|(\overline{V_{L2}} - \overline{V_{L1}})_x\right\|^2 + \left\|(\overline{V_{L2}} - \overline{V_{L1}})_y\right\|^2}$$

Figure 3:
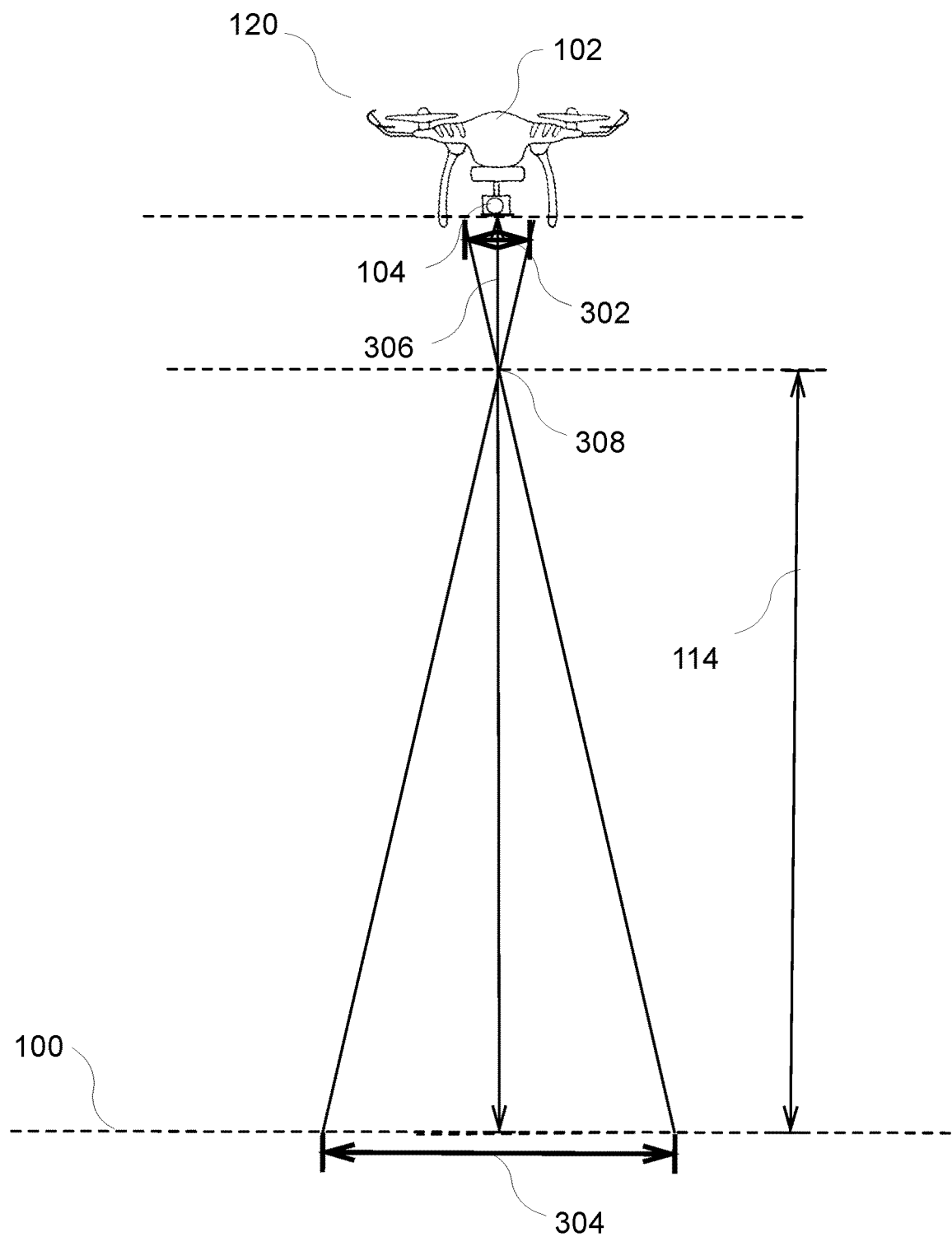
FIG. 3 illustrates an exemplary embodiment of the camera ground sample distance (GSD) estimation method of the present disclosure.

FIG. 3 illustrates an exemplary embodiment of the camera ground sample distance (GSD) estimation method of the present disclosure. The drone (102) has a digital camera (104). Assume the camera sensor (302) size is $D_c$, the camera lens focal distance (306) is $f_c$; the camera image resolution is W×H pixels. The altitude (114) is from the camera lens (308) to the ground level (100). then the GSD at altitude (114) is calculated as below:

$$GSD_x = \frac{D_c}{f_c \cdot W} \cdot \text{Altitude}$$

$$GSD_y = \frac{D_c}{f_c \cdot H} \cdot \text{Altitude}$$

So the GSD is proportional to the height of the drone (102) from the ground (100). If the camera (104) is not perfectly perpendicular to the ground level (100), the GSD will vary slightly from one side of the image to the other according to the distance from the object location to the camera lens (308).

Figure 4:
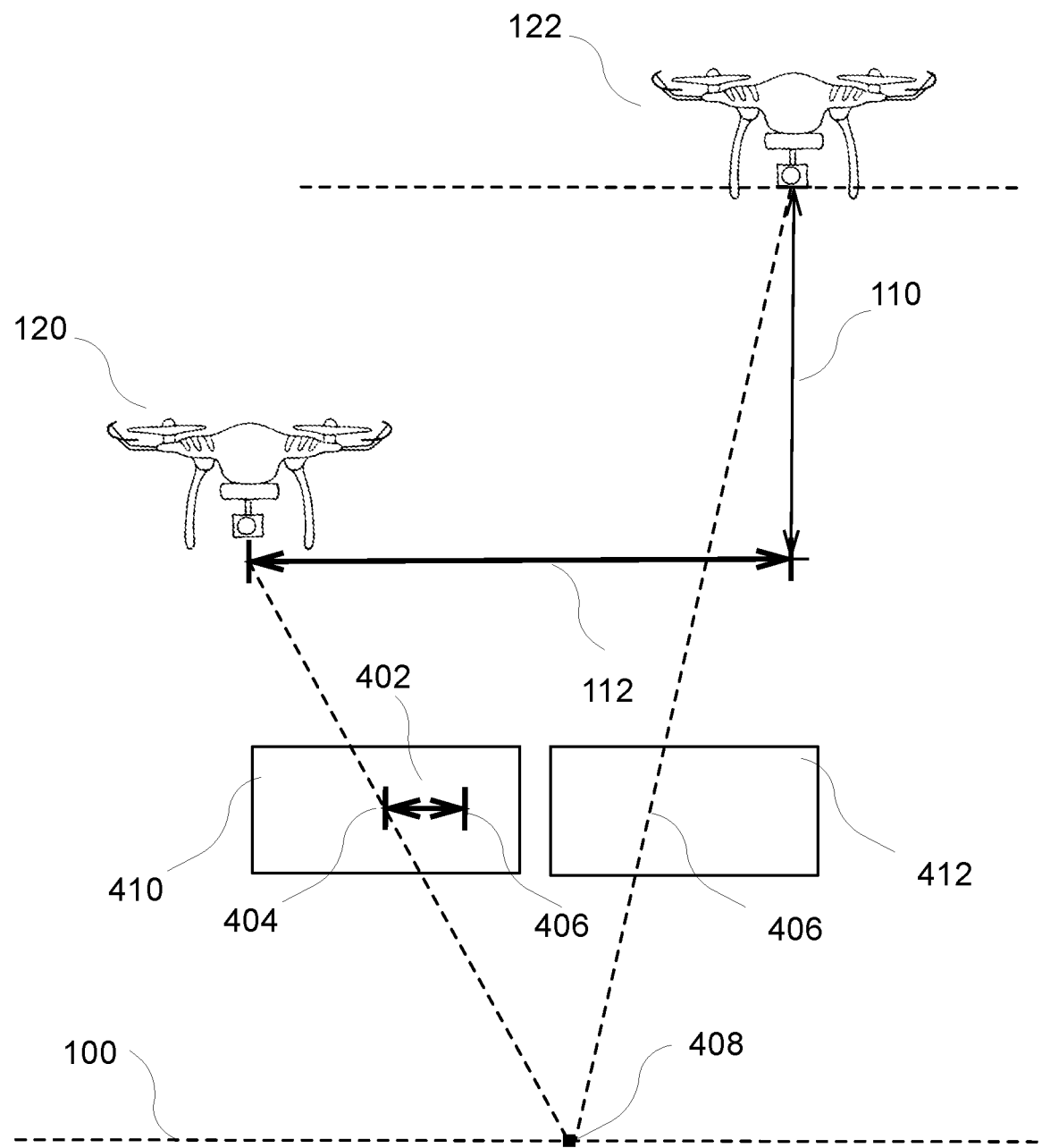
FIG. 4 illustrates an exemplary embodiment of the fast two-image wide-baseline stereo depth estimation method of the present disclosure.

FIG. 4 illustrates an exemplary embodiment of the fast two-image wide-baseline stereo depth estimation method of the present disclosure. Once an accurate estimation of the relative altitude difference DA (110), and the horizontal displacement DP (112) between the two drone locations (120) and (122) has been made, one can try to estimate the depth information of a point on the target object (408). In the exemplary embodiment of the present disclosure, the depth estimation can be carried out using a fast two-image wide-baseline stereo matching algorithm discussed in the present disclosure.

The first image (410) of the object point (408) is captured by the drone camera at the first location (120); the second image (412) of the object point (408) is captured by the drone camera at the second location (122). The pixel (404) of the first image (410) corresponds to the point (408) in the first image (410); the pixel (406) of the second image (412) corresponds to the point (408) in the second image (412). The pixel (406) of the first image (410) corresponds to its location in the first image (410). The difference (402) between the pixel location (404) and the pixel location (406) in the first images (410) is called disparity P in stereopsis. The depth information Z of the point (408) can then be estimated from the estimation of the disparity (402) P as below:

$$Z = \frac{DP \cdot f_c}{P}$$

FIG. 4 illustrates the case when the drone camera (104) is perfectly aligned between the two shootings at the first location (120) and the second location (122) respectively. So, the captured two images (410) and (412) are considered to be rectified and need no further modification to calculate the 3D pixel depth information.

To use the formula above to calculate the depth of each pixel in the image, the disparity of each pixel from the image pair must be calculated first. The disparity estimation starts from the stereo matching process. The whole concept of stereo matching is based on finding correspondences between the two input images. In one embodiment of the present disclosure, the correspondence between two points is determined by inspecting a block (n×n) of the neighborhood N pixels around both points. The pairing that has the lowest sum of absolute differences, $$SAD = \sum_{x \in N} |L(x) - R(x)|$$

is selected as a corresponding point pair. In practice, a matching block is located for each pixel in an image. The relative difference in the location of the points on the image planes is the disparity of that point. Due to the assumption of being constrained within a 1-dimensional search space, these disparities can be represented as a 2D disparity map that is the same size as the image. This is essentially a block-matching scheme familiar from video compression (a.k.a. motion estimation), although in this application the search space can be constrained to be horizontal only (with certain assumptions). The matching block size is one of the most important parameters that affects the outcome of the estimation. Smaller blocks can match finer detail, but are more prone to errors, while large blocks are more robust, but destroy detail. In the preferred embodiment of the present disclosure, a symmetrical square block of radius r has $(2r+1)^2$ pixels.

Figure 5:
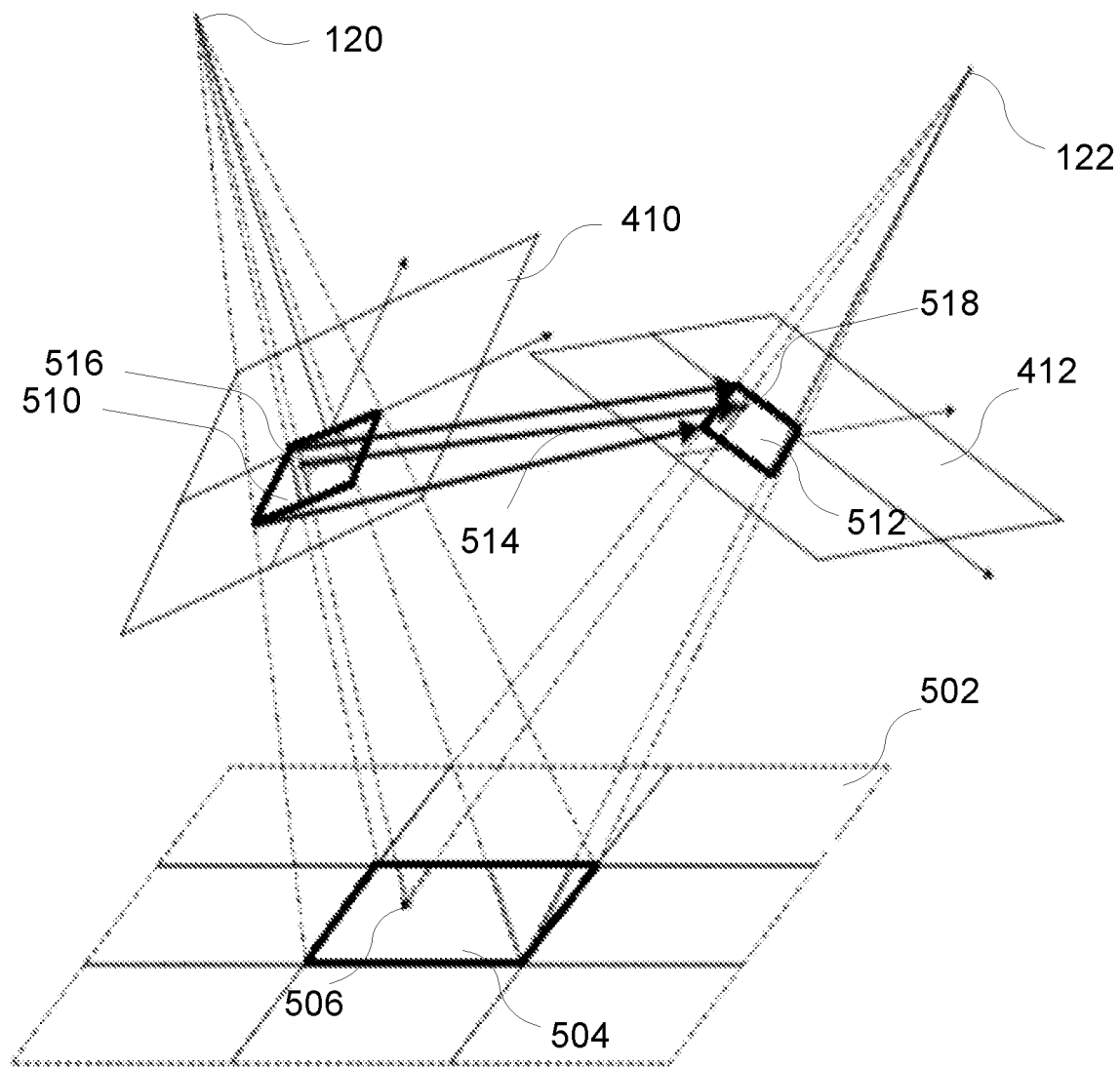
FIG. 5 illustrates a preferred embodiment of the single-camera stereo rectification method using 3D projective transformation of the present disclosure.

FIG. 5 illustrates a preferred embodiment of the new single-camera stereo rectification method using 3D projective transformation of the present disclosure. In this case, the two camera locations (120) and (122) are far from each other (wide-baseline, at different distances) and the two camera directions (angle position) are not aligned at all (unrectified). Therefore, the first image plane (410) and the second image plane (412) are not coplanar, and they are apart vertically with a relative altitude DA. The real object point (506) is captured in the first image (410) as the pixel (516), and captured in the second image (412) as the pixel (518). The neighborhood block (510) around the pixel (516) is used to match the neighborhood block (512) around the pixel (518) for stereo matching. They all correspond to the real-world neighborhood object point block (504) around the point (506).

In one embodiment of the present disclosure, the first step of the stereo rectification is to transform the second image plane 412 to be at the same altitude of the first image plane 410 by a projective projection. This is normally done by multiplying the pixel 3D coordinates with a 3-by-3 homography matrix. In one simplified exemplary embodiment of the present disclosure, this projective projection can be done by simply translating the estimated GSD of the second image plane 412 into the GSD of the first image plane 410. So, the second image is resized by the ratio below:

$$r_{scale} = \frac{(DA + Z_0)}{Z_0} = 1 + \frac{DA}{Z_0}$$

where DA is the accurate sensor fusion estimation of the relative altitude difference from the first drone location (120) to the second drone location (122). $Z_0$ is the depth estimation (114) of the second location (120).

Since $Z_0$ is not known at this time, in one of the embodiments of the present disclosure, a rough estimation of $Z_0$ will be used for the image rescaling. First calculate all the feature points in the first and second image using the Harris Corner Detector. Then select the 10 strongest feature points from each image. Calculate the SIFT feature detector values for each of the 10 feature points. Locate two pairs of the points—P11 in the first image matches P21 in the second image, and P12 in the first image matches P22 in the second image. Calculate the Euclidean distances ED1 between P11 and P12, and the Euclidean distances ED2 between P21 and P22. So $$Z_0 = \frac{DA \cdot ED2}{ED1 - ED2}$$

Stereo error generally increases with the square of the distance to the target object, but decreases with the baseline distance (the distance between the cameras). Wide-baseline stereo is based on the idea that an arbitrarily large baseline can be achieved using two images from the same camera, but at different positions. While this improves the quality of the stereo range estimates for a distant target object, it introduces two new problems: stereo calibration can no longer be performed in advance, since the relative positions and orientations of the cameras are not fixed. In addition, performing stereo matching between the images is more difficult, since the target object is seen from different viewpoints.

In the preferred embodiment of the present disclosure, the methodology is able to address these issues by performing the following steps:

Motion refinement. Use an estimate of the relative camera positions from the previous gyro and accelerometer readings, but this estimate is refined using matches detected between the images. This process uses several sub-steps:

(a) Feature selection. Features in one of the images are selected using the Forstner interest operator.

(b) Feature matching. Matches for the selected features are detected using a hierarchical search over the entire image. Note that both images are high-pass filtered to remove some illumination effects.

(c) Outlier rejection. Outliers are rejected by finding matches where the vertical and/or horizontal disparity is not in agreement with nearby points.

(d) Nonlinear motion estimation. Optimize the motion parameters using the Levenberg-Marquardt method with a robust objective function that minimizes the distances between the matched point locations and the locations back-projected using the estimated motion parameters.

2. Image rectification. The images are rectified so that the stereo match for each point lies on the same scan line. This reduces the search space for each point to one dimension.

3. Stereo matching. Dense stereo matches are detected using a maximum-likelihood image-matching formulation. Efficient stereo search techniques are used to reduce the search time. Finally, sub-pixel disparities are computed and outliers are rejected using a technique that eliminates small regions of nonconformity.

4. Triangulation. The position of each pixel relative to the camera is computed from the disparity using standard triangulation techniques.

Motion estimation requires a set of feature matches between the images. To accomplish this, first select up to 256 features that appear to be matchable from one of the images using the Forstner interest operator. For each image window, this operator considers both the strength and the isotropy of the gradients in the window. The features are selected in sub-regions of the image, to ensure that the features are well distributed in the image. They are also subject to a threshold, so that completely featureless regions do not contribute.

For each selected feature, we use a hierarchical multi-resolution search to locate the feature in the second image. This search first selects candidate matches at a low resolution. Each candidate match is then refined at a higher resolution. Optionally, affine matching is performed to further improve the quality of the matches. Finally, the best candidate is selected according to the scoring function (sum-of-absolute-differences in our implementation).

After matching has been performed, prune some matches from consideration. Two tests are used for pruning. First, if there is another candidate with a similar score to the top candidate, prune the match, since either could be correct. Second, estimate the standard deviation of the match position by examining how quickly the score changes as the match is moved. If the standard deviation is large, prune the match. Also remove outliers by comparing the disparities of the nearby points.

Once matches have been determined between the images, refine the estimated motion between the camera positions by enforcing geometrical constraints. Create a state vector consisting of the five recoverable motion parameters (the scale is not recoverable from this information) and the depth to each of the feature points with respect to the first camera position. The objective function uses the distance from each matched feature position to the back-projected position using the motion parameters and feature depth. The distances are combined in an M-estimator, such as described by Forsyth and Ponce, although a larger estimate for the scale yields convergence to the correct result more often. Given the state vector and object function, use a variation of Levenberg-Marquardt optimization in order to refine the input motion estimate.

Subsequent to the motion estimation, rectify the images using the method of Fusiello et al. After rectification, the correspondences between the images will lie on the same scan line, so that the search for each match can be performed in one dimension. Find dense matches between the images using a robust template matching method. This method has two advantages over typical matching methods, such as normalized correlation or the sum-of-squared-differences (SSD). Given a potentially matching location, many template matching methods assume that the mapping between pixels in the template and the search image is simply a translation, with no warping or nonlinearity, such as that caused by occlusion. Our method is more general and allows pixels in the template to match the search image at locations other than the implicit translation given by the relative position of the template. Use a measure that combines distance in the image with distance in intensity through a linear relationship.

The second improvement is that this measure explicitly accounts for the possibility of a pixel in the template with no corresponding match in the other image (for example, due to occlusion, which is common in wide-baseline stereo pairs). Accomplish this using a maximum-likelihood measure that incorporates the probability distribution function of both pixels with matches and pixels without matches.

Matching is performed efficiently using this measure by adapting a common stereo search strategy. This strategy prevents redundant computations from being performed for adjacent templates at the same displacement in the search image by saving information. The cost is a small amount of memory.

Estimate the sub-pixel disparity and standard deviation by fitting the scores near the maximum in the most likely match. Pixels are pruned from the output if the likelihood of the best match is low, the standard deviation is too large, or if the surrounding pixels do not form a large enough coherent block.

The techniques described above are able to handle inaccurate motion estimates and images captured from different viewpoints.

Once the disparity map P is estimated from the stereo-matching methods above, the relative depth estimation Z of the scene can be derived as below:

$$Z = \frac{DP \cdot f_c}{P}$$

where DP is the horizontal displacement between the two drone locations.

From depth estimation Z, the accurate GSD value of each image pixel can be calculated by the following $$GSD_x = \frac{D_c}{f_c \cdot W} \cdot Z$$

$$GSD_y = \frac{D_c}{f_c \cdot H} \cdot Z$$

With the dense GSD map, any measurement of the geometric properties in the captured survey image can be derived. The geometric properties include, but are not limited to, distance between any two points, the perimeter or area of any convex or concave shapes, etc.

Figure 6:
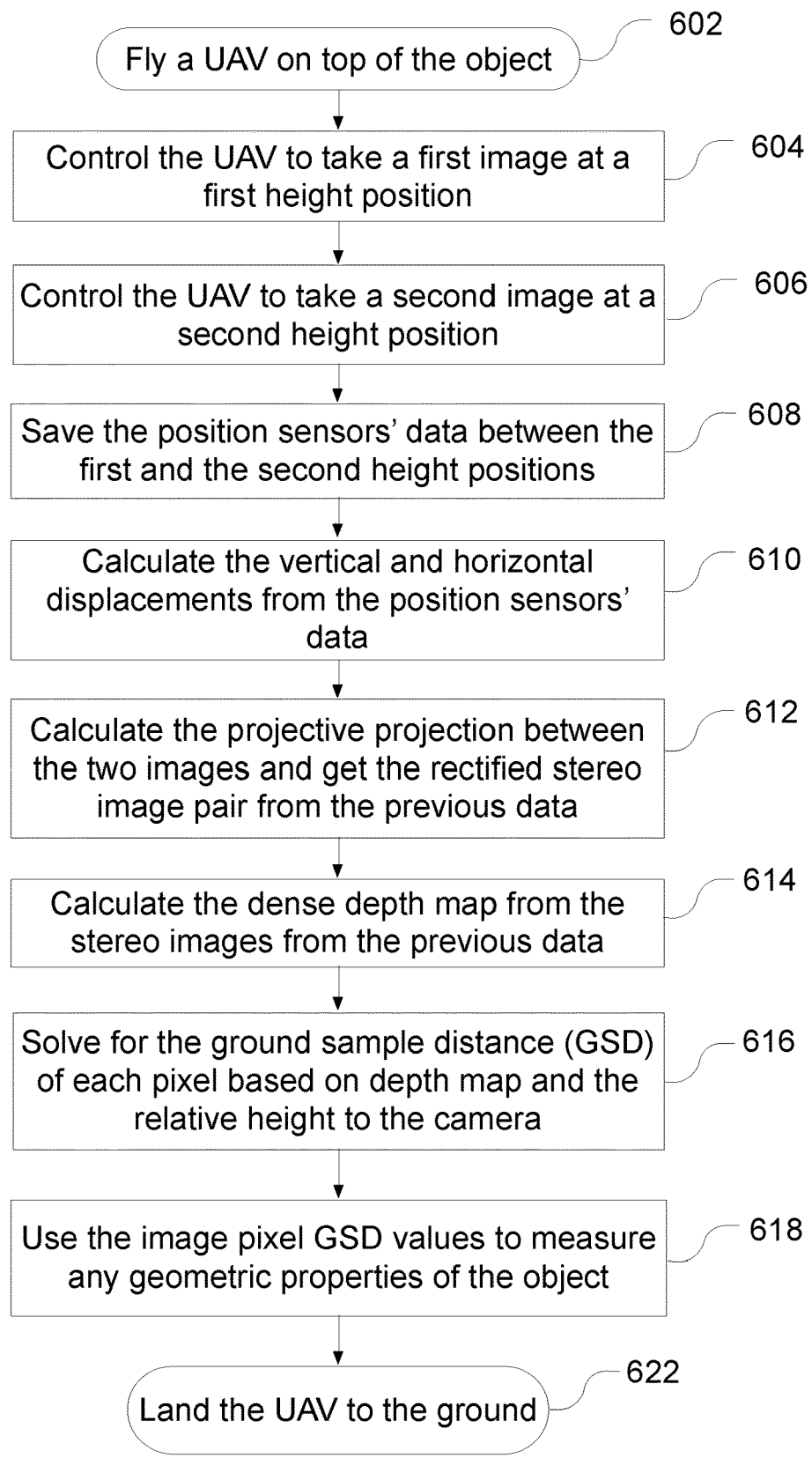
FIG. 6 illustrates an exemplary work flow diagram of the preferred stereoaerophotogrammetry methods of the present disclosure for aerial surveying.

FIG. 6 illustrates an exemplary work flow diagram of the preferred stereoaerophotogrammetry methods of the present disclosure for aerial surveying. In one exemplary workflow of the present disclosure, the following steps cover most of the operations of the method one needs to perform to conduct the stereo-aero-photogrammetric measurements. It includes the data collection and algorithm calculation.

As the first step in (602), fly a UAV or drone above a target object to be measured. For example, a house or building. Normally the UAV will be several times higher than the building height. The UAV's camera is facing down towards the building, and its gyro and accelerometer sensors are turned on and recording the data into memory or a database in the firmware. When the UAV flies to the first location with a first height (604), control the UAV to take a first image. Fly the UAV to the second location with a second height (606), control the UAV to take a second image. In the preferred embodiment of the present disclosure, the second location has a higher height than that of the first location. However, it is obvious to the ordinarily skilled in the art that the second location can be anywhere from the first location. The step (608) actually happens during the step (604) and (606), controlling the UAV to record the position sensors' (gyro and accelerometer) readings between the first and second locations. All the data is saved in step (608). By this step, the data collection phase is completed. One can see the operations are simple and fast—the whole process can be completed in a couple of seconds.

Next, based on the sensor data, calculate the vertical and horizontal displacements in the step (610) using the methods described in the present disclosure. Calculate the projective projection between the two captured images and get the rectified stereo image pair from the previously collected data in step (612). In (614) one can use the preferred method described in the present disclosure to estimate the dense depth map from the stereo images. Equipped with the derived dense depth map, solve for the ground sample distance (GSD) of each pixel in the image based on both the depth and the relative heights to the camera in (616). Finally, measure any geometric properties of the target object in (618). In the end, as an option, land the UAV on the ground in (622) and a cycle of the single-camera stereo-aero-photogrammetry using UAV sensors is completed.

What is claimed:

1. A method of conducting aerial survey, comprising:
   flying an unmanned aerial vehicle over a target object, wherein the unmanned aerial vehicle has a camera, gyro, and accelerometer;
   using the camera to take a first aerial image at a first location; and a second aerial image at a second location, wherein the second location has a non-zero vertical and horizontal distance from the first location;
   calculating the relative vertical and horizontal distance using a fusion estimation algorithm on the gyro and accelerometer readings, wherein the fusion estimation algorithm comprises:
   collecting real-time sensor readings from the gyro and accelerometer;
   filtering the real-time sensor readings with a pre-processing filter;
   calculating the integration of the filtered accelerometer readings regulated by minimizing the mean squared error between the filtered gyro readings and the gyro readings estimated from the filtered accelerometer readings;
   solving the pixel depth information of the aerial images by using a stereophotogrammetry algorithm and the calculated relative vertical and horizontal distances;
   deriving the ground sample distance of each pixel from the pixel depth information;
   using the ground sample distance values to compute a geometric property of the target object.

2. The method of claim 1, wherein the unmanned aerial vehicle is a drone.

3. The method of claim 1, wherein the pre-processing filter is a Kalman filter.

4. The method of claim 1, wherein the stereophotogrammetry algorithm includes a motion refinement step, image rectification step, stereo matching step, and triangulation step.

5. The method of claim 4, wherein the image rectification step involves using a homography matrix.

6. The method of claim 4, wherein the motion refinement step includes a feature selection step, feature matching step, outlier rejection step, and nonlinear motion estimation step.

7. The method of claim 6, wherein the feature is the result of a Harris Corner, SIFT, or Forstner interest operator.

8. The method of claim 6, wherein the feature matching step involves using a hierarchical multi-resolution search.

9. The method of claim 6, wherein the nonlinear motion estimation step involves using the Levenberg-Marquardt method.

10. The method of claim 6, wherein a disparity is calculated for each pixel from the rectified image.

11. The method of claim 1, wherein the pixel depth information is solved by finding the difference of the space vectors of the first and the second locations.

12. The method of claim 1, wherein the altitudes of the first and second locations are estimated from the horizontal and vertical distances between the first and second locations.

13. The method of claim 1, wherein the ground sample distance is derived from the camera's focal distance and sensor size.

14. The method of claim 1, wherein the method of computing the geometric property using the ground sample distance values, comprising:
   selecting a path between a first and second pixel on one of the aerial images;
   collecting all the pixels along the path;
   estimating the path distance by calculating the integration of the ground sample distance values of all the pixels along the path.

15. An apparatus of conducting aerial survey, comprising:
   an unmanned aerial vehicle that has a processor and a plurality of sensors;
   wherein the plurality of sensors comprises a camera, gyro, and accelerometer;
   wherein the unmanned aerial vehicle can fly over a target object from a first location to a second location, wherein the second location has a non-zero vertical and horizontal distance from the first location;
   wherein the camera takes a first aerial image at the first location and a second aerial image at the second location;
   wherein the processor first calculates the relative vertical and horizontal distance using a fusion estimation algorithm on the gyro and accelerometer readings, wherein the sensor fusion estimation algorithm comprises:
   collecting real-time sensor readings from the gyro and accelerometer;
   filtering the real-time sensor readings with a pre-processing filter;
   calculating the integration of the filtered accelerometer readings regulated by minimizing the mean squared error between the filtered gyro readings and the gyro readings estimated from the filtered accelerometer readings;

wherein the processor then solves the pixel depth information of the aerial images by using a stereophotogrammetry algorithm and the calculated relative vertical and horizontal distances;

wherein the processor then derives the ground sample distance of each pixel from the pixel depth information;

wherein the processor lastly uses the ground sample distance values to compute a geometric property of the target object.

16. The apparatus of claim 15, wherein the unmanned aerial vehicle is a drone and the pre-processing filter is a Kalman filter.

17. The apparatus of claim 15, wherein the stereophotogrammetry algorithm includes a motion refinement step, image rectification step, stereo matching step, and triangulation step.

18. The apparatus of claim 17, wherein the image rectification step involves using a homography matrix.

19. The apparatus of claim 17, wherein the motion refinement includes a feature selection step, feature matching step, outlier rejection step, and nonlinear motion estimation step.

20. The apparatus of claim 15, wherein the processor is a remote processor wirelessly connected to the unmanned aerial vehicle.

* * * * *